United States Patent
Doyon

[11] Patent Number: 6,129,500
[45] Date of Patent: Oct. 10, 2000

[54] RECIPROCATING CONVEYOR

[76] Inventor: Paul Doyon, 2470 Quatre-Bourgeois, app. 11, Ste-Foy (Qc), Canada, G1V 1W7

[21] Appl. No.: 09/072,662

[22] Filed: Apr. 25, 1998

[51] Int. Cl.[7] ............................................. B60P 1/00
[52] U.S. Cl. ...................... 414/528; 198/750.1; 198/842; 414/510; 414/514; 414/492; 414/518
[58] Field of Search ..................... 414/510, 514, 414/518, 528, 492; 198/750.1, 842

[56] References Cited

U.S. PATENT DOCUMENTS

| | | | |
|---|---|---|---|
| 286,052 | 10/1883 | Miller | 414/510 |
| 482,785 | 9/1892 | Compton | 414/510 |
| 507,122 | 10/1893 | Harrington | 414/510 |
| 1,251,372 | 12/1917 | Hewitt | 414/510 X |
| 2,027,278 | 1/1936 | Marsh | 414/510 |
| 2,140,974 | 12/1938 | Wagner et al. | 414/510 |
| 2,264,157 | 11/1941 | Baker et al. | 414/510 |
| 2,788,136 | 4/1957 | Hebert et al. | 414/510 X |
| 3,771,673 | 11/1973 | Moeller | 414/514 |
| 4,747,747 | 5/1988 | Fusco . | |

FOREIGN PATENT DOCUMENTS

| | | |
|---|---|---|
| 694165 | 5/1962 | Canada . |
| 2088723 | 2/1993 | Canada . |
| 2109248 | 10/1993 | Canada . |
| 2115511 | 2/1994 | Canada . |

*Primary Examiner*—Robert P. Olszewski
*Assistant Examiner*—Steven B. McAllister

[57] ABSTRACT

In a trailer, a conveyor comprises a floor and two walls, each comprising a band and series of rollers. All the rollers of the walls are identical. The rollers of the floor are not. The first roller of the floor, at the discharge end, has a diameter larger than that of other rollers. The last roller, at the charge end, comprises cogs. The floor band is attached at both ends to a pad stream forming an endless conveyor with the floor band. The cogs fit into holes in the pads. The top floor band is of a rubber base and is dust tight; the bottom band is made of pads attached to each other by piano hinges. The cogs make the pad stream move alternatively from one end to the other, thereby causing the motion of the floor band towards the discharge end of the trailer and its return to the charge end. An angle iron joins the bands of the floor and of the walls to drag the band of the walls along with the top band of the floor. The discharge end roller, elevated, keeps the materials in the conveyor during transport.

5 Claims, 4 Drawing Sheets

RECIPROCATING CONVEYOR

BACKGROUND-FIELD OF INVENTION

This invention belongs to the family of bin conveyors especially for trucks

BACKGROUND-DESCRIPTION OF THE PRIOR ART

A number of patents illustrate certain related conveyors:

CA, 694,165, Knight, Stanley W., May 14, 1962, illustrates a reciprocating mechanism for conveyors. The sheet is driven by chains. The walls are not mobile.

CA, 2,088,723, Foster Raymond, Feb. 3, 1993, is a reciprocating conveyor floor. The floor is made of longitudinal slats that move back and forth together or independently.

CA, 2,109,248, Musso, Charles, Oct. 26, 1993, is a tipper truck comprising an integrated conveyor.

CA, 2,115,511, Pellegrino, Luigi, Feb. 11, 1994, is an apparatus to load and unload trucks. The conveyor has two rollers, one at each end, that engage an endless chain. The sheet is made of a plurality of slats.

U.S. Pat. No. 4,747,747, Fusco, May 31, 1988; shows holes in a band through which a fine material may escape. A rear wall moves. A cogged wheel engages the hoes of the bend 14.

SUMMARY OF THE INVENTION

The first objective of this invention to provide means to a farmer to load and unload various field materials like vegetables, haystacks or rocks. This conveyor should adapt to a vehicle. It should also have side walls and means to prevent materials from sliding out during transport.

The invention is a conveyor that contains and unloads material loaded in the conveyor and comprises in combination: a mobile floor extended between a loading end and an unloading end; a wall comprising means to lessen a friction from the motion of the material against the wall, the wall being perpendicular to the floor; means to retain the material at the unloading end, to keep the material on the floor; means to retain the material at the loading end to keep the material on the floor; and reciprocatinig means to move the floor from the loading end to the unloading end and to move it back to the loading end.

The conveyor also comprises an endless belt and at least two end rollers: one unloading roller and one loading roller. At least one of the end rollers comprises cogs to engage the belt. The belt comprises two parts, fastened end to end. The first part is an upper part made of a continuous and dusttight band. The second part is a lower part formed of a series of slats joined together by flexible means, the slats comprising holes to receive the cogs.

The wall comprises and endless band moving around vertical rollers, to follow the floor in its movement.

The conveyor also comprises means for fastening the wall and the floor so the endless band will follow the exact movement of the floor. The means for fastening are an angle iron mounted on both the band of the wall and the floor.

There may be a second wall, parallel to the wall and defining a width of the floor.

The reciprocating means comprise hydraulic means to create a movement from a starting point, located at the loading roller, to the unloading roller and to move it back to the starting point.

Means to retain the material located at the loading end of the conveyor are a spread of the material from the unloading end to the loading end. The material at the loading end retains the material at the unloading end during transport. The means to retain the material at the loading end is a panel, placed along the width at the floor, to push the material towards the unloading end while unloading.

The conveyor also comprises middle rollers, between the end rollers to provide continuous support to the floor.

The means to retain the material at the unloading end comprises the unloading roller of a diameter being the half of the height of the wall added to the diameter of the loading roller.

The middle rollers comprise lower rollers, of a diameter sufficient to cover the innerspace of the floor, and upper rollers, of a small diameter, located over the nearest points between two lower rollers, to provide the floor with continuous support. There is a support roller loacted between the unloading roller and the series of middle rollers to support the floor in its ascent. The middle rollers are close together and the band comprises slats of a width equivalent to the diameter of the middle rollers.

BRIEF DESCRIPTION OF THE DRAWINGS

The present invention will be further understood from the following description with reference to the drawings in which.

DESCRIPTION OF THE PREFERRED EMBODIMENT

Figure 1:
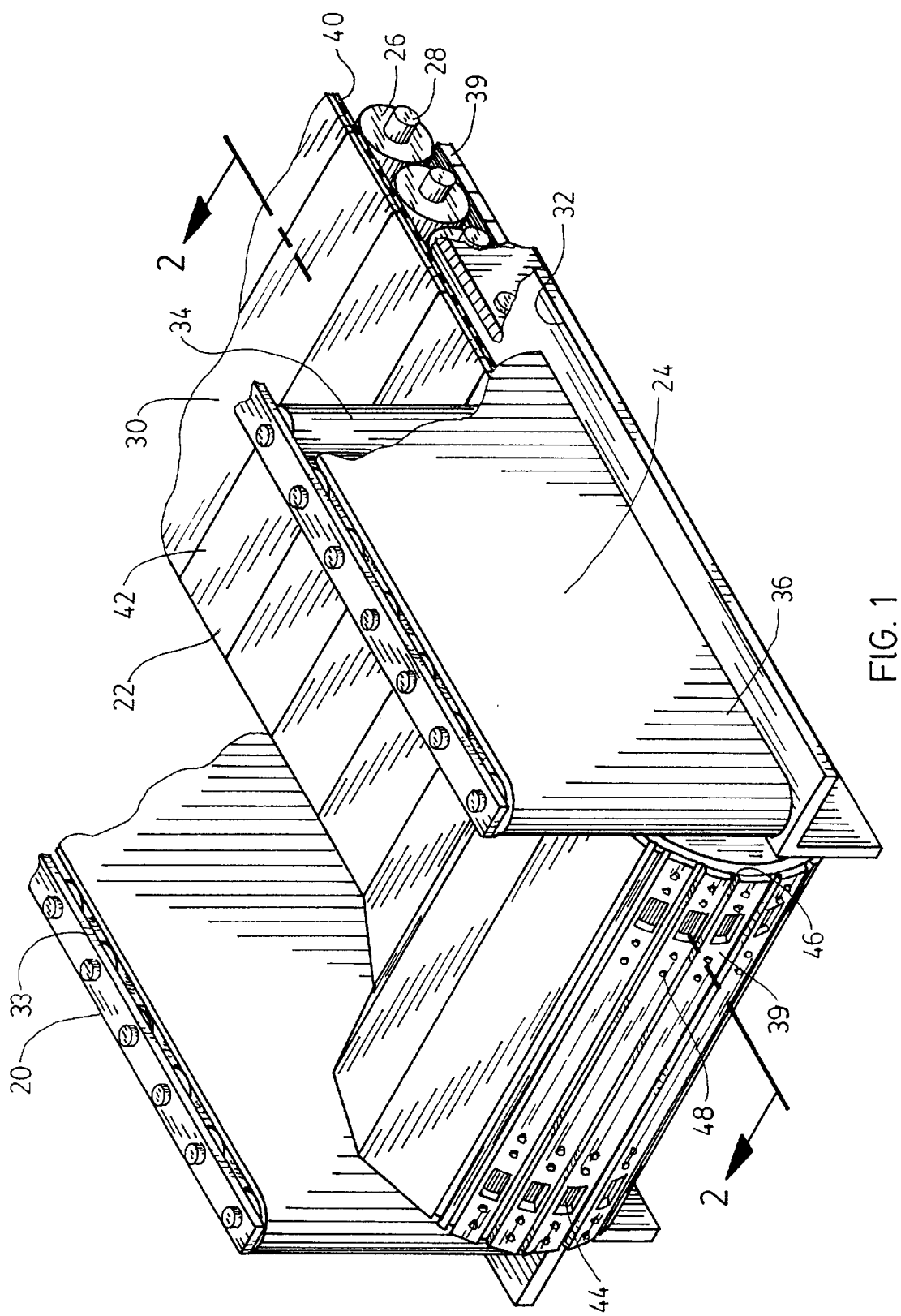
FIG. 1 is a perspective of a discharge end of a conveyor.

The preferred embodiment of the invention is illustrated in FIG. 1 where the same characterizing elements are identified by the same numbers.

FIG. 1 shows the discharge end of a conveyor 20 comprising a floor 22 and two walls 24. The floor 22 is made of series of horizontal rollers 26 comprising bearings 28 and covered with a band 30. The walls 24 are identical and located on each side of the floor 22. Each wall 24 is made of series of vertical rollers 34, also covered with a wall band 36. Under the walls 24 is a support 32, of an inverted L-shape. The horizontal and vertical rollers are mounted on the support 32. A bar 33 is placed over the vertical rollers 34 and holds them in place. The support 32 also serves to fix the conveyor on a trailer or truck. The part of the band 30 that is over the floor 22 is covered by a sheet 40. The part under the floor is made of a plurality of parallel reciprocating slats 39 joined to one another by hinges 46. Each slat 39 has a hole 44 at each end et is fixed on the hinges 46 by bolts 48. The embodiment of FIG. 1 shows superior slats 42 covering the sheet 40.

Figure 2:
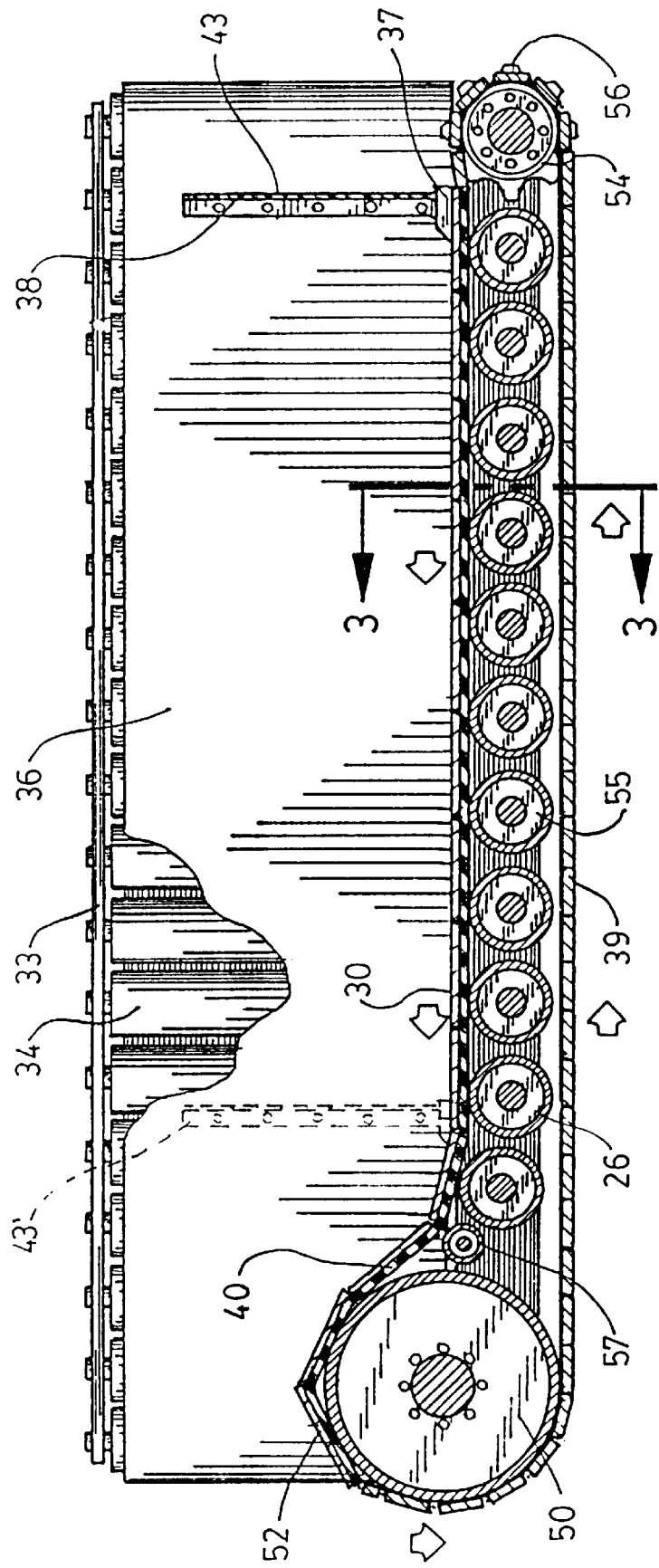
FIG. 2 is a cross section according to line 2—2 of FIG. 1.

FIG. 2 illustrates the series of horizontal rollers 26 comprising rollers of various sizes. The discharge end roller 50 has a larger diameter to create a bump 52 to keep materials inside during transport. The face of the charge end roller 54 has cogs 56, corresponding to the holes 44 of the band 30 and making it rotate. The middle rollers 55, between the front roller 50 and the rear roller 54, have a diameter similar to the one of the rear roller 54. A support roller 57, of a small diameter, is placed between the front roller 50 and the middle rollers 55. The support rollers 57 is fixed higher on the support 32 than the other rollers to support the sheet 40 on its way up on the front roller 50. An angle iron 38 is fixed on the back part, on both the floor band 30 and the wall band 36, so that the floor band 30 drag the wall band in its motion. A panel 43 is fixed on this angle iron to form a rear wall and prevents the material from sliding out during transport. One can also see the wall band 36 and the vertical rollers 34, held in placed by the bar 33.

Figure 3:
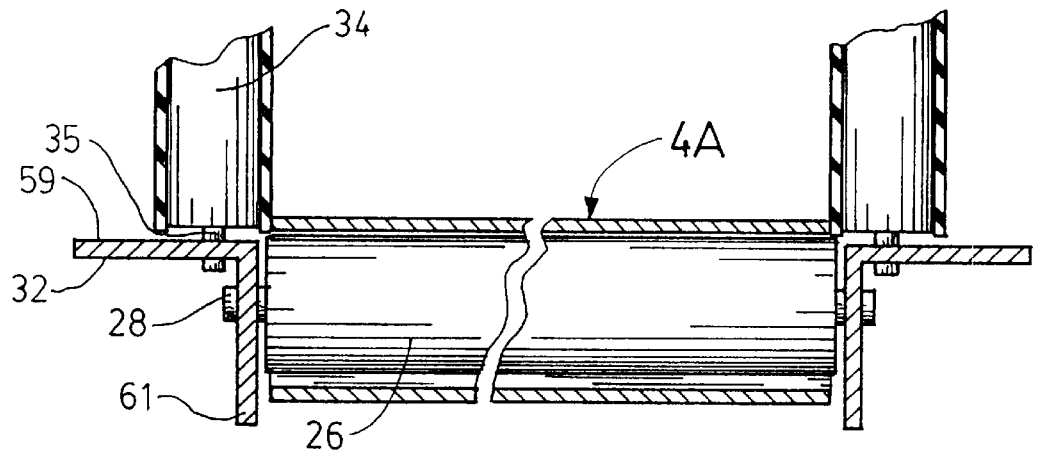
FIG. 3 is a cross section according to line 3—3 of FIG. 2.

FIG. 3 shows the support 32, of an inverted L-shaped. The horizontal part 59 of the support 32 receives the bearings 35 of the vertical rollers 34, while the vertical part 61 of the support 32 receives the bearings 28 of the horizontal rollers 26.

Figure 4A:
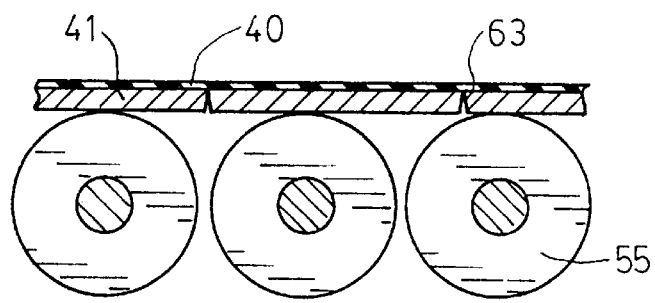
FIG. 4A is a detail of the area shown by the arrow 4A of FIG. 3.

FIG. 4A shows the middle rollers 55 and a part of the band 30. The slats 42 are under the sheet 40, the sides 63 of the slats are bevelled to permit the slats to go around the front roller 50.

Figure 4B:
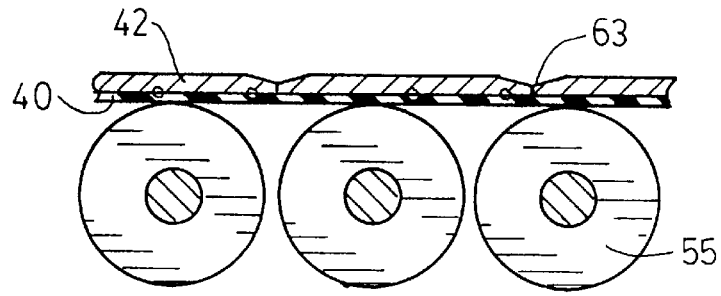
FIG. 4B is a view of an alternative to FIG. 4A.

The alternative of FIG. 4B is similar to the one of FIG. 4A. In this alternative the sheet 40 is under the slats 42. Their sides 63 are not bevelled.

Figure 4C:
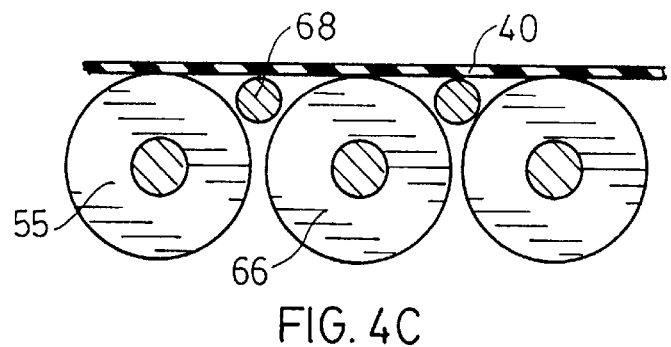
FIG. 4C is a view of a second alternative to FIG. 4A.

FIG. 4C shows another alternative on which the sheet 40 alone moves on the middle rollers 55. There are two kinds of middle rollers 55, lower rollers 66 and upper rollers 68. The series of lower rollers 66 form a set of rollers that goes from the front roller 50 to the rear roller 54. Each lower roller has a diameter sufficient to cover the height between the sheet 40 of the band 30 and the slats 42 under the rollers 66. Each lower roller 66 is almost in contact with the following lower roller 66. An upper roller 68 is smaller than a lower roller 66 and is located over the contact point between two lower rollers 66, so the sheet 40 is supported on all its length.

Figure 5:
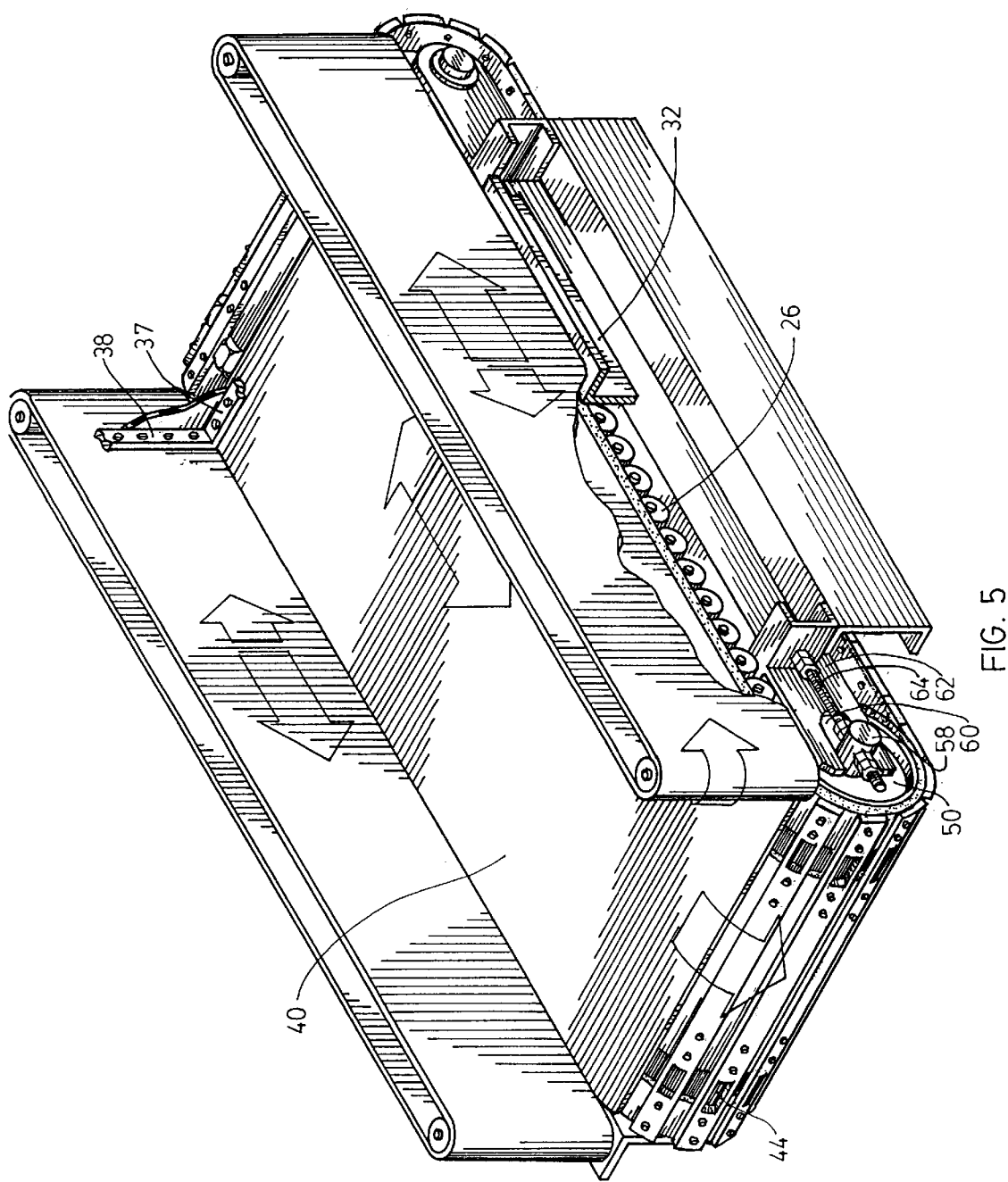
FIG. 5 is a perspective of an alternative to FIG. 1.

FIG. 5 shows the conveyor. The band 30 is covered by a sheet 40 in its upper part. The band 30 has a smooth surface on top while having holes 44 on the remaining part of the band 30 to rotate it around the horizontal rollers 26. To unload, the sheet 40 moves forward, up to the point where the angle iron 27 gets to the front roller 50, where it is stopped by a switch 51 (not shown). The conveyor is unloaded. Then the band 30 turns in the opposite direction and the sheet 40 returns to its initial position. The bearing 58 of the front roller 50 is inserted in a slot 60, cut into the side 62 of the conveyor 20. An endless screw 64, mounted on the support 32, goes through the bearing 58 and allows adjustment of the position of the front roller 50 and thus, the tension of the band.

The horizontal rollers 26 are in aluminium and have different diameters. The front roller 50 could have a diameter of 12–18". the rear roller 54 of 6". The rollers 68 would have a diameter of 6" and the upper roller 1" or they could be replaced by slats located over and under the sheet 40. The sheet 40 is of rubber and covers the top of the floor 22.

PARTS LIST 20 conveyor
22 floor
24 wall
26 horizontal roller
27 angle iron
28 bearing
30 band
32 support
33 bar
34 vertical roller
35 bearing
36 band
38 angle iron
40 sheet
42 slat
44 hole
46 hinge
48 bolt
50 front roller
52 bump
54 rear roller
55 middle roller
56 cog
57 support roller
58 bearing
60 slot
61 vertical part
62 side
63 bevelled side
64 endless screw
66 lower roller
68 upper roller

I claim:

1. A conveyor that contains and unloads material loaded in said conveyor and comprising in combination:

a mobile floor extended between a loading end and an unloading end, said floor made of an endless belt, said belt comprising two parts, fastened end to end: an upper part made of a continuous and dusttight band, and a lower part formed of a series of slats joined together by flexible means, said slats comprising holes;

a wall comprising means to lessen a friction from the motion of said material against said wall, said wall being perpendicular to said floor, means to retain said material at said unloading end, to keep said material on said floor, means to retain said material at said loading end to keep said material on said floor, reciprocating means to move said floor from said loading end to said unloading end and to move it back to said loading end; at least two end rollers, that is one unloading roller and one loading roller, at least one of said end rollers comprises cogs to engage said holes of said slats; middle rollers, between said end rollers to provide substantially continuous support to said floor.

2. The conveyor of claim 1 wherein said means to retain said material at said unloading end comprises said unloading roller of a diameter being the half of the height of said wall added to the diameter of said loading roller.

3. The conveyor of claim 1 wherein said middle rollers comprise lower rollers, of a diameter sufficient to fill the space between said upper part and lower part of said belt, and upper rollers, of a small diameter, located over the nearest points between two lower rollers, to provide said floor with a substantially continuous support.

4. The conveyor of claim 2 comprising a support roller located between said unloading roller and middle rollers to support said floor in its ascent.

5. The conveyor of claim 1 wherein said middle rollers are close together and wherein said band comprises slats of a width equivalent to the diameter of said middle rollers.

* * * * *